US007142959B2

(12) United States Patent
Oesterling et al.

(10) Patent No.: US 7,142,959 B2
(45) Date of Patent: Nov. 28, 2006

(54) PROVIDING STATUS DATA FOR VEHICLE MAINTENANCE

(75) Inventors: Christopher L. Oesterling, Troy, MI (US); Frederick J. Beiermeister, Farmington Hills, MI (US); Jeffrey M. Stefan, Clawson, MI (US)

(73) Assignee: General Motors Corporation, Detroit, MI (US)

( * ) Notice: Subject to any disclaimer, the term of this patent is extended or adjusted under 35 U.S.C. 154(b) by 494 days.

(21) Appl. No.: 10/697,217

(22) Filed: Oct. 30, 2003

(65) Prior Publication Data

US 2005/0096020 A1 May 5, 2005

(51) Int. Cl.
*G01M 17/00* (2006.01)

(52) U.S. Cl. ........................ 701/29; 701/208; 701/213; 340/993

(58) Field of Classification Search .................. 701/29, 701/30, 200, 207, 208, 210, 211, 213; 340/991, 340/992, 993; 455/456.1, 456.3, 457, 458
See application file for complete search history.

(56) References Cited

U.S. PATENT DOCUMENTS 6,493,620 B1 * 12/2002 Zhang ......................... 701/45
6,687,587 B1 * 2/2004 Kacel .......................... 701/33
6,728,612 B1 * 4/2004 Carver et al. ................. 701/33
6,757,262 B1 * 6/2004 Weisshaar et al. .......... 370/310
6,771,742 B1 * 8/2004 McCalmont et al. ......... 379/45
6,810,323 B1 * 10/2004 Bullock et al. ............. 701/206
6,853,910 B1 * 2/2005 Oesterling et al. .......... 701/207
6,978,206 B1 * 12/2005 Pu et al. ..................... 701/200

OTHER PUBLICATIONS

Kelly Carroll, Data to ride shotgun: InfoMove helps connect cars to Internet, Telephony Dec. 13, 1999, Copyright 1999 by PRIMEDIA Business Magazines & Media Inc., "All Rights Reserved", Telephony, Spectrum; ISSN: 0040-2656, 1091 words.
Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.
Bob Low, Motoring in the new millennium on the Net, Daily Record, May 1, 1998, Copyright 1998 Scottish Daily Record & Sunday Mail Ltd., Daily Record & Sunday Mail Ltd., Daily Record May 1, 1998, Friday, p. 31 Road, 734 words.
Tarre Beach, New Products; SIDEBAR, Wireless Review Apr. 1, 2000, Copyright 2000 by PRIMEDIA Business Magazines & Media Inc., "All rights Reserved" Wireless Review, Apr. 1, 2000, New Products; ISSN: 1099-9248, 351 words.
Flint, Mich., Jan. 3, BUIC XP2000-A Concept Cat For The 21st Century, PR Newswire, Jan. 3, 1995, Copyright 1995 PR Newswire Association, Inc. PR Newswire, Jan. 3, 1995, Tuesday, Financial News, (With Photo) To Business and Auto and Editors, 2149 words.

* cited by examiner

*Primary Examiner*—Richard M. Camby
(74) *Attorney, Agent, or Firm*—Anthony Like Simon

(57) ABSTRACT

The current invention provides a system and method for providing status data for vehicle maintenance. A GPS location trigger is monitored for at a telematics unit. Communication between the telematics unit and a call center is initiated responsive to the GPS location trigger. Status data is sent from the vehicle to the call center through the telematics unit. At least a portion of the status data is sent from the call center to a service center associated with the GPS location trigger. A computer usable medium with suitable computer program code is employed for providing status data for vehicle maintenance.

18 Claims, 5 Drawing Sheets

FI . 1

PROVIDING STATUS DATA FOR VEHICLE MAINTENANCE

FIELD OF THE INVENTION

This invention relates generally to telematics systems. In particular the invention relates to a system and method for providing status data for vehicle maintenance.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage.

Status data, stored in a vehicle, contains information on a variety of vehicle systems and includes diagnostic codes for many vehicle functions. Service Centers access some of this status data when a vehicle is brought in for service. This status data is only available to a service center having the proper equipment to access the data. Other parties, such as vehicle owners and vehicle manufacturers can also benefit by access to this status data but do not have the opportunity for or the equipment for access to the status data.

Scheduled vehicle maintenance and unscheduled vehicle repairs are a part of vehicle ownership. Maintenance and repairs are frequently costly events for both vehicle owners and vehicle manufacturers. The cost, to the manufacturer, of maintaining a warranty can be significant while the cost of out of warranty repairs can be a burden for a vehicle owner. By reducing warranty costs a vehicle manufacturer can reduce its own costs as well as the cost of ownership to the vehicle owner. Access to data regarding the frequency or repair required by various vehicle components and by particular vehicle models, is helpful in allowing manufacturers to reduce warranty claims.

Labor charges are a major component of maintenance and repair bills. Avoiding unnecessary repairs saves a vehicle owner both time and money. Streamlining the vehicle servicing process improves customer satisfaction and can help prevent unnecessary repairs and saves time for both the service center and the vehicle owner.

It is desirable therefore, to provide a system and method for providing status data for vehicle maintenance, that overcomes the challenges and obstacles described above.

SUMMARY OF THE INVENTION

The current invention provides a method for providing status data for vehicle maintenance. A GPS location trigger is monitored for at a telematics unit. Communication between the telematics unit and a call center is initiated responsive to the GPS location trigger. Status data is sent from the vehicle to the call center through the telematics unit. At least a portion of the status data is sent from the call center to a service center associated with the GPS location trigger.

Another aspect of the current invention provides a computer usable medium including computer program code for providing status data for vehicle maintenance. The computer program code monitors for a GPS location trigger at a telematics unit. The computer program code initiates communication between the telematics unit and a call center responsive to the GPS location trigger. The computer program code sends status data from the vehicle to the call center from the telematics unit and then sends at least a portion of the status data from the call center to a service center associated with the GPS location trigger.

Another aspect of the current invention provides a system for providing status data for vehicle maintenance. The system comprises: means for monitoring for a GPS location trigger at a telematics unit; means for initiating communication between the telematics unit and a call center responsive to the GPS location trigger; means for sending status data from the vehicle to the call center from the telematics unit; and means for sending at least a portion of the status data from the call center to a service center associated with the GPS location.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
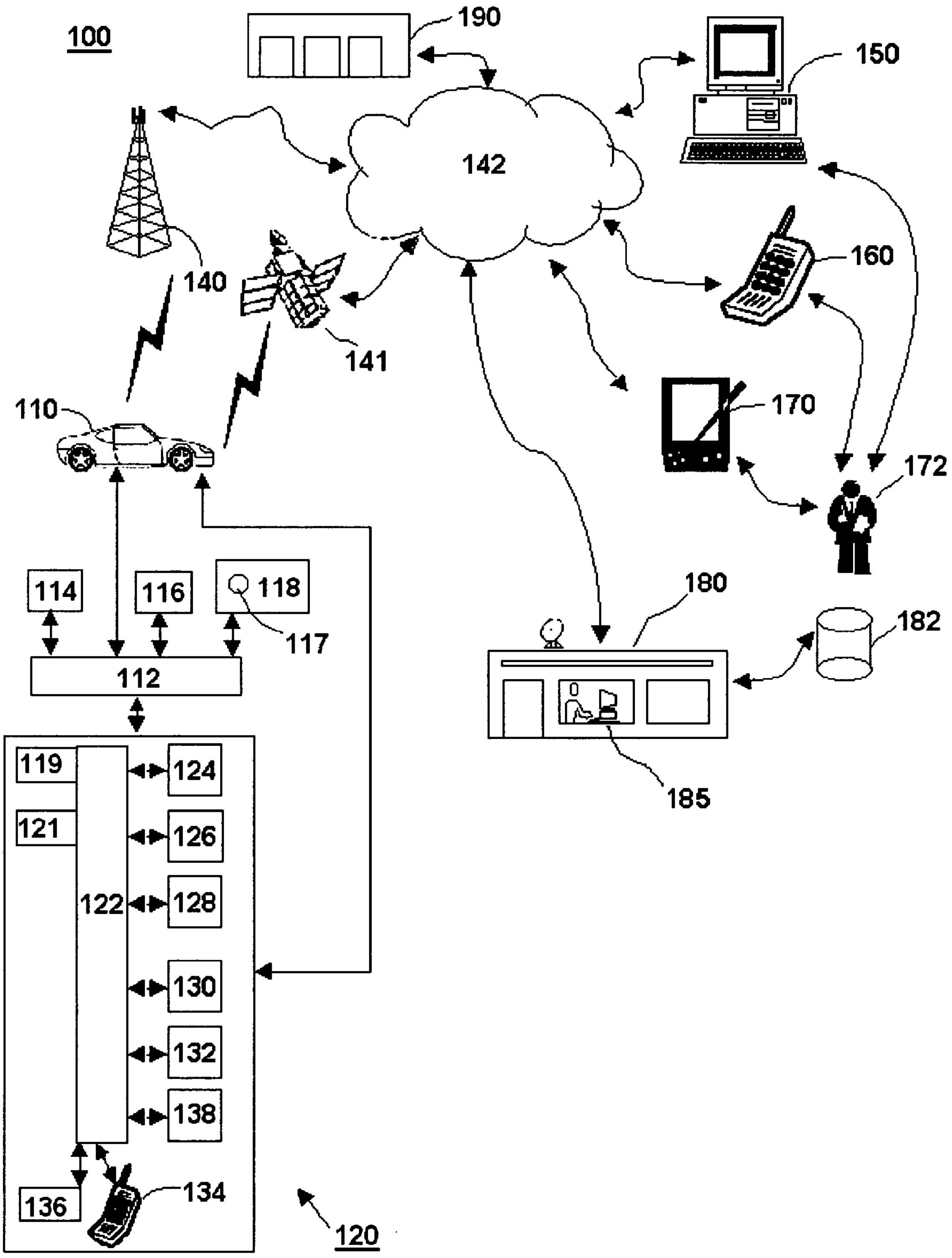
FIG. 1 is a schematic diagram of a system for providing status data for vehicle maintenance in accordance with one embodiment of the current invention.

FIG. 1 is a schematic diagram of a system for notifying a subscriber of events in accordance with one embodiment of the current invention at 100. Subscriber notification system at 100 comprises: a mobile vehicle 110, a telematics unit 120, one or more wireless carrier systems 140, one or more satellite carrier systems 141, one or more communication networks 142, and one or more call centers 180. Mobile vehicle 110 is a vehicle such as a car or truck equipped with suitable hardware and software for transmitting and receiving speech and data communications. Vehicle 110 has a multimedia system 118 having one or more speakers 117.

In one embodiment of the invention, telematics unit 120 comprises: a digital signal processor (DSP) 122 connected to a wireless modem 124; a global positioning system (GPS) receiver or GPS unit 126; an in-vehicle memory 128; a microphone 130; one or more speakers 132; an embedded or in-vehicle phone 134 or an email access appliance 136; and a display 138. DSP 122 is also referred to as a microcontroller, microprocessor, controller, host processor, ASIC, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store service center GPS location data, vehicle data upload (VDU) records, and other data files in in-vehicle memory 128. Telematics unit 120 can set or reset calling-state indicators and can enable or disable various cellular-phone, telematics-unit functions and vehicle components when directed by microcode running on DSP 122. Telematics unit 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120. DSP 122 controls communications between telematics unit 120, wireless carrier system 140 or satellite carrier system 141 and call center 180. A speech-recognition engine 119, which can translate human speech input through microphone 130 to digital signals used to control functions of telematics unit, is installed in telematics unit 120. The interface to telematics unit 120 includes one or more buttons (not shown) on telematics unit 120, multimedia system 118, or an associated keyboard or keypad that are also used to control functions of telematics unit. In one embodiment, pressing a button in vehicle 110 activates speech recognition engine 119. Pressing the button sends a signal that places the telematics unit in audio arbitration mode allowing it to respond to speech commands. A text to speech synthesizer 121 can convert text strings to audible messages that are and played through speaker 132 of telematics unit 120 or through speakers 117 of multimedia system 118.

Speech recognition engine 119 and buttons (not shown) are used to activate and control various functions of telematics unit 120. For example, programming of in-vehicle phone 134 is controlled with verbal commands that are translated by speech-recognition software executed by DSP 122. Alternatively, pushing buttons on interface of telematics unit 120 or on in-vehicle phone 134 is used to program in-vehicle phone 134. In another embodiment, the interface to telematics unit 120 includes other forms of preference and data entry including touch-screens, wired or wireless keypad remotes, or other wirelessly connected devices such as Bluetooth-enabled devices or 802.11-enabled devices.

DSP 122 controls, generates and accepts digital signals transmitted between telematics unit 120 and a vehicle communication bus 112 that is connected to various vehicle components 114, various sensors 116, and multimedia system 118 in mobile vehicle 110. DSP 122 can activate various programming and operation modes, as well as provide for data transfers. In one embodiment of the invention, signals from DSP 122 are translated into speech messages and sent out through speaker 132. Generated speech messages comprise instruction and feedback messages for transfers of status data for vehicle maintenance. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks, and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive short messages according to established protocols such as dedicated short range communication standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center 180 is a telematics call center, facilitating communications to and from telematics unit 120 in mobile vehicle 110. In another embodiment, the call center 180 is a voice call center, providing verbal communications between a communication service advisor 185, in call center 180 and a subscriber. In another embodiment, call center 180 contains each of these functions.

Communication services advisor 185 is a real advisor or a virtual advisor. A real advisor is a human being in verbal communication with a user or subscriber. A virtual advisor is a synthesized speech interface responding to requests from user or subscriber. In one embodiment, virtual advisor includes one or more recorded messages. In another embodiment, virtual advisor generates speech messages using a call center based text to speech synthesizer (TTS). In another embodiment virtual advisor includes both recorded and TTS generated messages.

Call center 180 provides services to telematics unit 120. Communication services advisor 185 provides one of a number of support services to a subscriber. Call center 180 can transmit and receive data via data signal, such as vehicle data upload (VDU) or status data for vehicle maintenance, to telematics unit 120 in mobile vehicle 110 and to a vehicle service center 190 through wireless carrier system 140, satellite carrier systems 141, or communication network 142. Call center 180 can store status data for vehicle maintenance in a call center database 182 and provide that data to subscriber, service center, or vehicle manufacturer with proper authorization.

Call center 180 can determine mobile identification numbers and telematics unit identifiers associated with a telematics unit access request, compare mobile identification numbers and telematics unit identifiers with a database of identifier records, and send calling-state messages to the telematics unit 120 based on the request and identification numbers.

In one embodiment of the invention, a user 172 has a local provisioning system such as a user computer 150 or a handheld device 170 such as a personal digital assistant (PDA). Local provisioning system has a wireless modem to send data through wireless carrier system 140, or satellite carrier system 141, which connects to communication network 142. In another embodiment, local provisioning system has a wired modem, which connects to communications network 142. Data is received at call center 180. Call center 180 has any suitable hardware and software capable of providing web services to help transmit messages and data signals from local provisioning system to telematics unit 120 in mobile vehicle 110. In another embodiment, local provisioning system has suitable hardware and software to connect to mobile vehicle 110 using a direct link to a mobile vehicle onboard data port. Call center 180 can also supply data to user 172 from call center database 182.

In one embodiment of the invention, a service center's GPS location is transmitted from call center 180 to telematics unit 120 through communication network 142 and stored in memory 128 of telematics unit 120 as a service center GPS location. Telematics unit 120 through computer code running on DSP 122 can compare the vehicle's current GPS location to the service center GPS location stored in memory 128 of telematics unit 120. Vehicle service center 190 can receive vehicle status data, sent from vehicle 110, transmitted from call center 180. Telematics unit 120 can send service center location requests to and receive service center GPS locations from call center 180.

Figure 2:
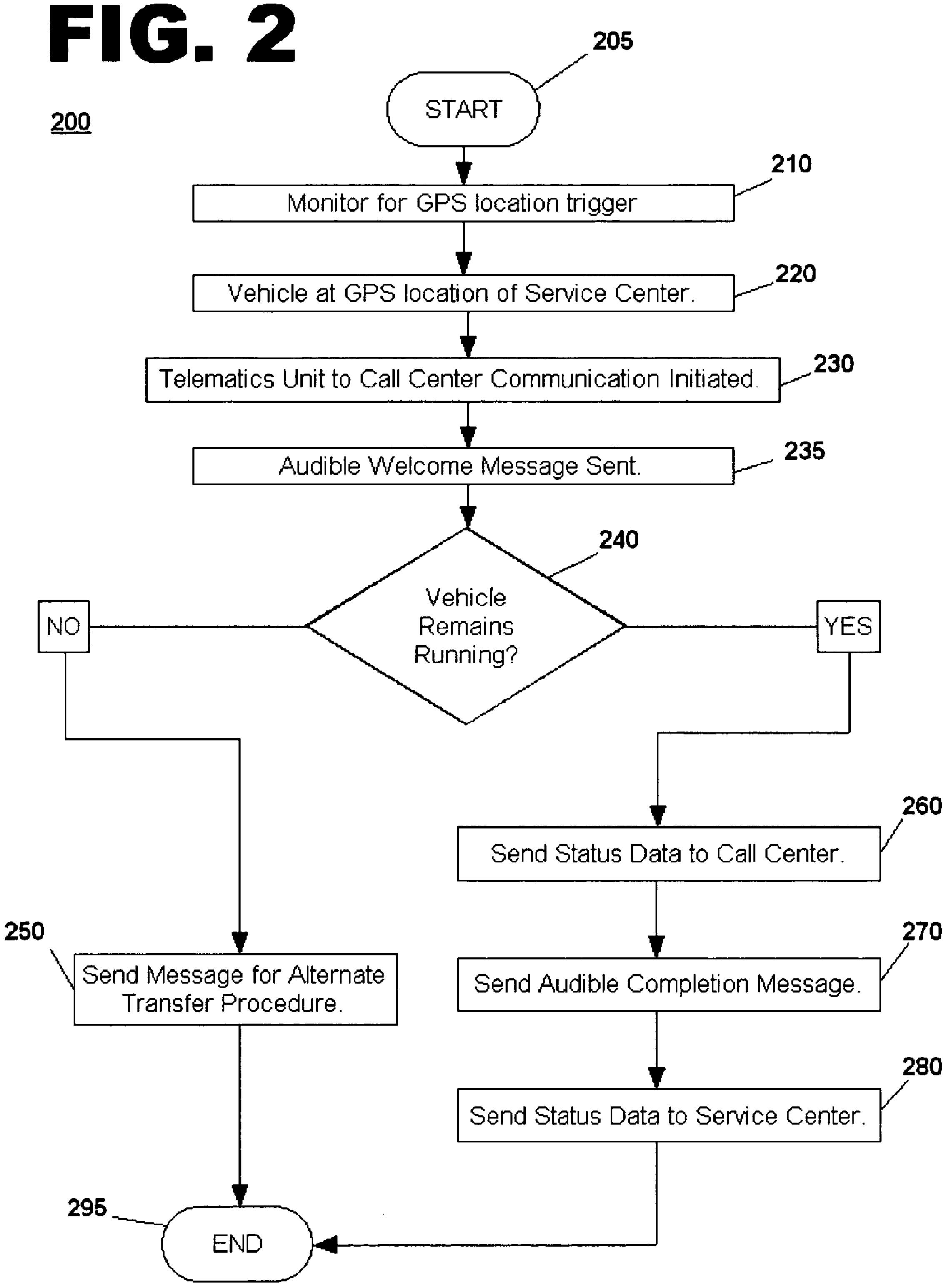
FIG. 2 is a flow diagram of a method for providing status data for vehicle maintenance in accordance with one embodiment of the current invention.

FIG. 2 is a flow diagram of a method for providing status data for vehicle maintenance in accordance with one embodiment of the current invention. The method for providing status data for vehicle maintenance at 200 begins (block 205) with the telematics unit monitoring a vehicle's current GPS location for a match with a service center GPS location (block 210). A predetermined GPS location, corresponding to the location of a vehicle service center and stored in the telematics unit, defines the service center GPS location. The determination of a match between the two locations, for a predetermined length of time, is a GPS location trigger. For example, a match would occur when the vehicle enters a service center's drop-off location (block 220).

When a GPS location trigger is detected by telematics unit 120, communication between the telematics unit 120 of the vehicle and the call center 180 is initiated (block 230). An audible welcome message is sent, from the telematics unit, such as "Welcome, you have connected to the status data transfer facility" (block 235). The message also requests that the vehicle remain running. The text to speech synthesizer of the telematics unit enunciates audible messages so that the user hears the messages through a speaker located in the vehicle. In another embodiment, messages are shown on a display monitor. The vehicle will either remain running or will not remain running (block 240).

If the vehicle remains running, status data; such as oil life percent, diagnostic trouble codes, and calibration parameters; are sent to the call center (block 260). The telematics unit sends an audible completion message, such as "status data transfer complete, thank you" (block 270). After the status data is received at the call center, at least a portion of the status data is sent to the service center from the call center (block 280) and the method ends (block 295). The call center can grant access to the call center database, to any authorized party such as a vehicle manufacturer, a vehicle owner or a service center.

If the vehicle does not remain running, an audible message is sent requesting activation of an alternate transfer procedure (block 250) and the method ends (block 295). One example of the alternate transfer procedure comprises sending an activation signal that mimics the GPS location trigger and initiates data communication between the telematics unit and the call center. Examples of alternate activation signals include a control signal sent in response to a button press at the vehicle or a control signal sent from the call center to the telematics unit upon request by the vehicle owner or the service center.

Figure 3:
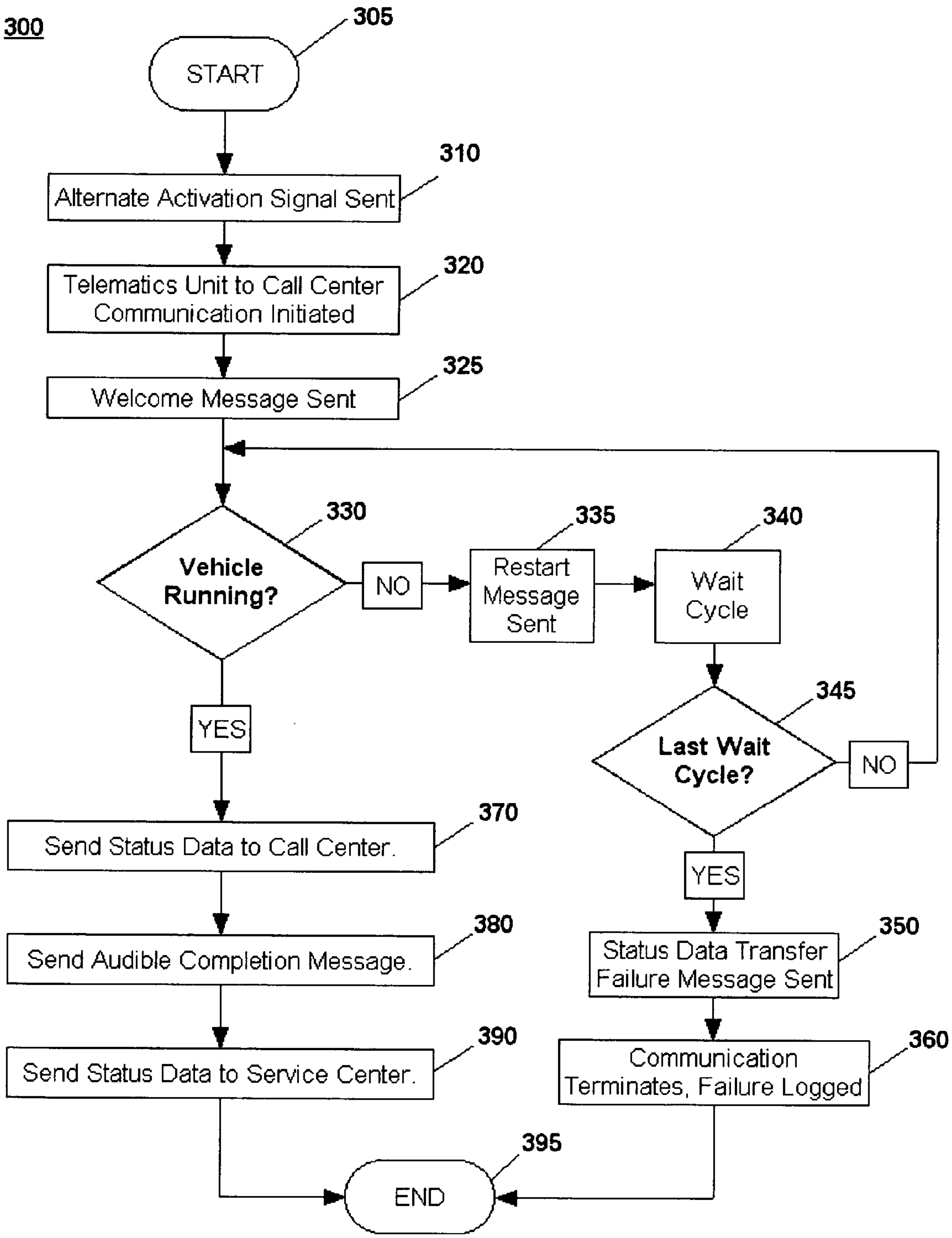
FIG. 3 is a flow diagram of an alternate method for providing status data for vehicle maintenance in accordance with one embodiment of the current invention.

FIG. 3 is a flow diagram of an alternate method for providing status data for vehicle maintenance in accordance with one embodiment of the current invention at block at 300. Alternate method for providing status data for vehicle maintenance at 300 begins (block 305) when an alternate activation signal is received at the telematics unit (block 310). Communication between the telematics unit of the vehicle and the call center is initiated when the activation signal is received (block 320). An audible welcome message is sent, from the telematics unit, such as "Welcome, you have connected to the status data transfer facility" (block 325). If the vehicle is not running, status data transfer cannot proceed. Either the vehicle is running or the vehicle is not running (block 330).

If the vehicle is running, status data, such as oil life percent, diagnostic trouble codes, and calibration parameters are sent to the call center (block 370). The telematics unit then sends an audible completion message (block 380). After the status data is received at the call center, at least a portion of the status data is sent to the service center (block 390) and the method ends (block 395).

If the vehicle is not running an audible message is sent instructing the user to restart the vehicle for status data transfer to proceed (block 335). The telematics unit waits, for a predetermined period of time called a wait cycle, for a vehicle restart to occur (block 340). The audible message to restart the vehicle is repeated at the beginning of each wait cycle. The vehicle restart will or will not occur before a predetermined number of wait cycles has elapsed (block 345). For example, the wait cycle in one embodiment is 5 minutes. In another embodiment, the wait cycle is 30 seconds. In one example, the vehicle restart is checked after 3 wait cycles. In another example, the vehicle restart is checked after 10 wait cycles.

If the vehicle restart does occur before the predetermined number of wait cycles has elapsed, status data, such as oil life percent, diagnostic trouble codes, and calibration parameters; are sent to the call center (block 370). The telematics unit then sends an audible completion message (block 380). After the status data is received at the call center, at least a portion of the status data is sent to the service center (block 390) and the method ends (block 395). If the vehicle restart does not occur before the predetermined number of wait cycles has elapsed, a status data transfer failure message is sent (block 350). Communication between the telematics unit and the call center terminates and the call center logs the failure (block 360). The method then ends (block 395).

Figure 4:
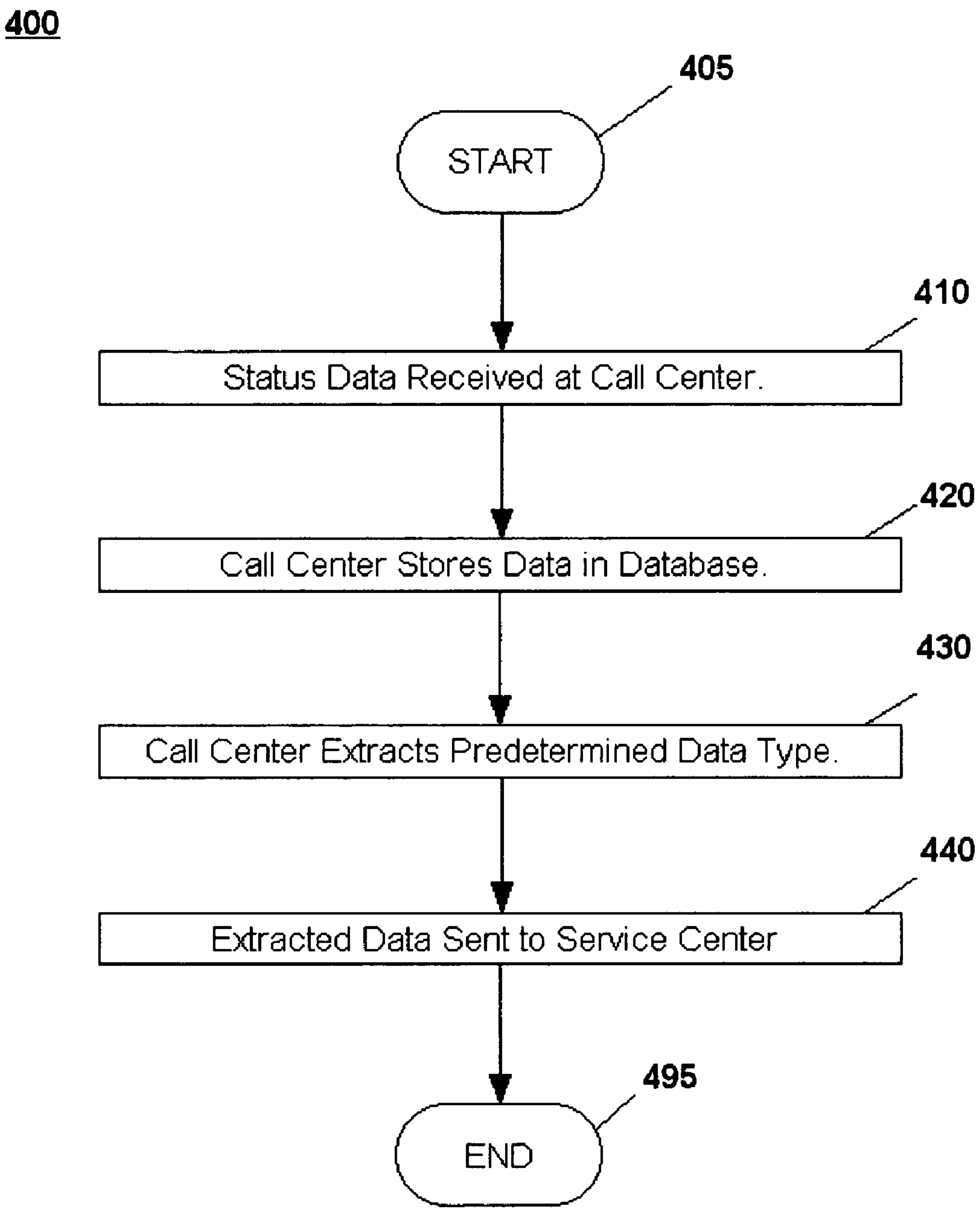
FIG. 4 is a flow diagram detailing the step of sending at least a portion of the status data at block 280 of FIG. 2 and block 390 of FIG. 3 at 400.

FIG. 4 is a flow diagram detailing the step of sending at least a portion of the status data at block 280 of FIG. 2 and block 390 of FIG. 3. Sending at least a portion of the status data begins (block 405) when the status data is received at the call center (block 410). The call center stores the received status data as a record in the call center database (block 420). The call center then extracts a predetermined data type, from the record in the database, to send to the service center (block 430) and transfers the extracted data to the service center (block 440). The predetermined data type extracted is the portion of the status data that the service center, at which the vehicle is located, is authorized to receive. The step ends (block 495). Examples of predetermined data types are mileage and oil life percentage for an oil change shop or electrical system diagnostic codes for a shop specializing in vehicle electrical systems. Service centers, at some times, will require only a portion of the status data, for a particular vehicle, stored in the call center database, such as diagnostic codes for a component needing repair. At other times, a service center will require all status data, for a particular vehicle, stored in the call center database. The call center can also supply historical data, if necessary, regarding the vehicle.

Each database record, maintained by the call center, acts as a snapshot of a vehicle's condition at the time the status data was transferred to the call center, which also corresponds to the time when the vehicle arrived at the service center. Access to these records provides useful information to vehicle owners, vehicle manufacturers, and vehicle service centers. Access may either be direct or indirect. Direct access is access provided to specific records utilizing a username and password. Indirect access is access to specific records by requesting them through a call center advisor. Vehicle owners, with access to a record of their vehicle's condition at the time it was left with the service center, can compare repairs made with diagnostic codes from the vehicle to determine if the repairs were necessary. The call center can provide vehicle information in a format intended to be understood by a vehicle owner. Frequency of repair data provides vehicle manufacturers with information they can use to improve their vehicles. The call center can produce requested reports from data stored in the call center database.

Figure 5:
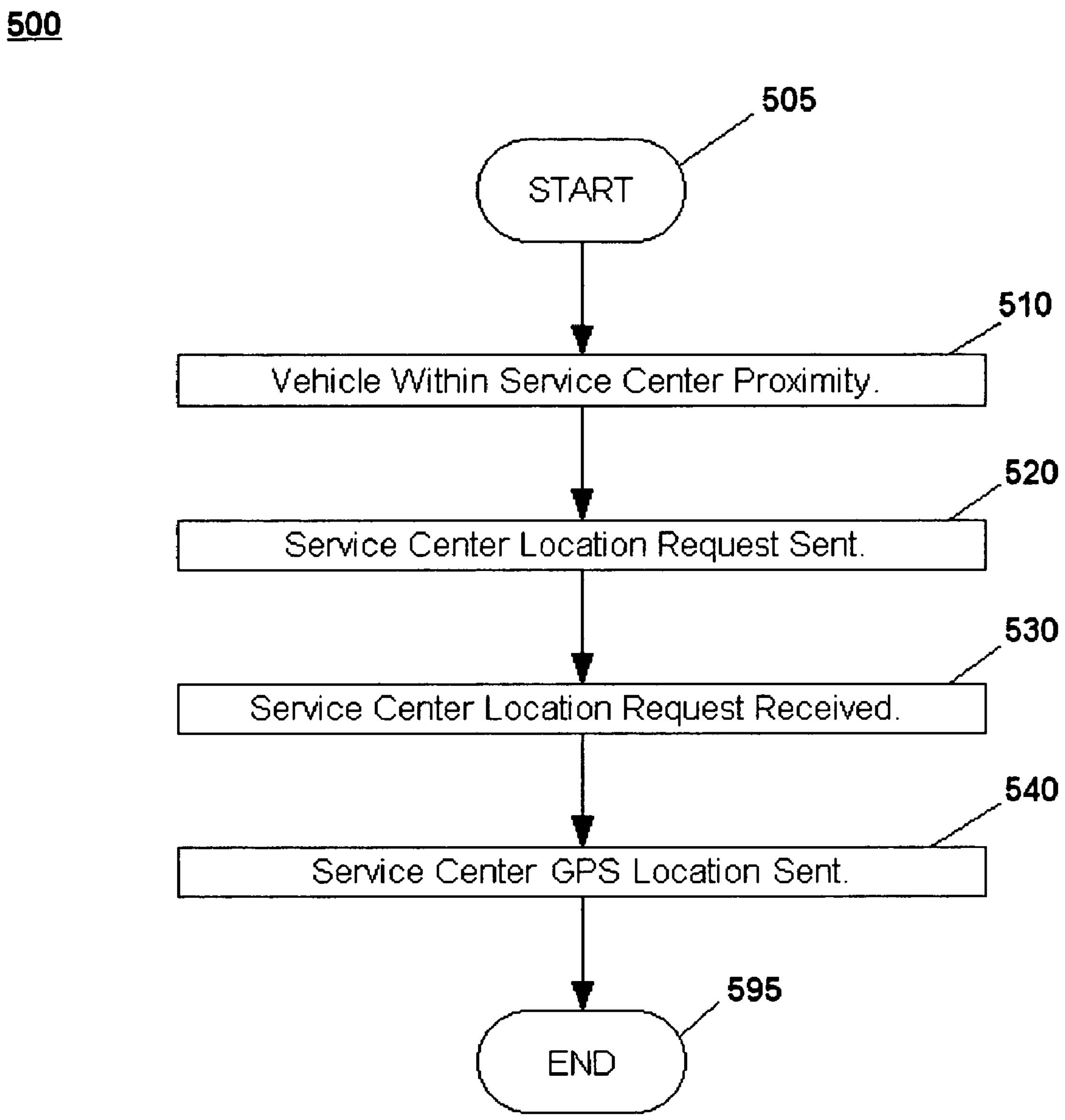
FIG. 5 is a flowchart of a method for providing a service center GPS location to a telematics unit in accordance with one embodiment of the invention.

FIG. 5 is a flowchart of a method for providing a service center GPS location to a telematics unit in accordance with one embodiment of the invention, at 500. Service center GPS locations are stored in memory of the telematics unit. Not all possible service center GPS locations are stored in memory of the telematics unit. When a vehicle travels outside a given service area, the telematics unit can send a service center location request. A vehicle owner or service center can also send a service center location request using a phone or an Internet enabled interface. The service center location request is a request for a service center GPS location of a local service center. Method for providing service center GPS location to telematics unit at 500 begins (block 505) when it is determined that a vehicle is within a service center proximity (block 510). When vehicle is within the service center proximity, a service center location request is sent to the call center (block 520). A service center proximity is when the vehicle is within a predetermined distance from a service center or is within a certain service center zone as defined by the call center. The service center location request is received at a call center (block 530). In response to the service center location request, the call center sends the service center GPS location to the telematics unit of the vehicle (block 540) and the method ends (block 595).

In one embodiment, the service center location is stored in a lookup table and the lookup table is consulted to determine proximity. In another embodiment, the lookup table is provided at a manufacturing facility. In another embodiment, the lookup table is sent by the call center to the telematics unit after activation of telematics services. In another embodiment, the lookup table is provided or updated as a result of vehicle location.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing status data for vehicle maintenance, the method comprising:

monitoring for a GPS location trigger at a telematics unit;

initiating communication between the telematics unit and a call center responsive to the GPS location trigger;

sending status data from the vehicle to the call center from the telematics unit; and sending at least a portion of the status data from the call center to a service center associated with the GPS location trigger.

2. The method of claim 1 wherein monitoring for a GPS location trigger comprises:

determining a current GPS location; and determining if the current GPS location matches a service center GPS location stored in the telematics unit.

3. The method of claim 1, wherein sending at least a portion of the status data comprises:

storing the status data to a call center database; and extracting a predetermined data type from the call center database to send to the service center.

4. The method of claim 1, wherein the GPS location trigger is an activation signal received at the telematics unit.

5. The method of claim 1, further comprising:

determining whether the vehicle is within a service center proximity; and sending a service center location request based on the determination.

6. The method of claim 5, further comprising:

receiving a service center location request from a vehicle telematics unit at a call center; and sending a service center GPS location from the call center to the telematics unit based on the service center location request.

7. A computer readable medium, including computer program code, for providing status data for vehicle maintenance, the computer program code comprising:

computer program code for monitoring for a GPS location trigger at a telematics unit;

computer program code for initiating communication between the telematics unit and a call center responsive to the GPS location trigger;

computer program code for sending status data from the vehicle to the call center from the telematics unit; and computer program code for sending at least a portion of the status data from the call center to a service center associated with the GPS location trigger.

8. The computer readable medium of claim 7 wherein computer program code for monitoring for a GPS location trigger comprises:

computer program code for determining a current GPS location; and computer program code for determining if the current GPS location matches a service center GPS location stored in the telematics unit.

9. The computer readable medium of claim 7, wherein computer program code for sending at least a portion of the status data comprises:

computer program code for storing the status data to a call center database; and computer program code for extracting a predetermined data type from the call center database to send to the service center.

10. The computer readable medium of claim 7, wherein the GPS location trigger is an activation signal received at the telematics unit.

11. The computer readable medium of claim 7, further comprising:

computer program code for determining whether the vehicle is within a service center proximity; and computer program code for sending a service center location request based on the determination.

12. The computer readable medium of claim 11, further comprising:

computer program code for receiving a service center location request from a vehicle telematics unit at a call center; and computer program code for sending a service center GPS location from the call center to the telematics unit based on the service center location request.

13. A system for providing status data for vehicle maintenance, the system comprising:

means for monitoring for a GPS location trigger at a telematics unit;

means for initiating communication between the telematics unit and a call center responsive to the GPS location trigger;

means for sending status data from the vehicle to the call center from the telematics unit; and means for sending at least a portion of the status data from the call center to a service center associated with the GPS location trigger.

14. The system of claim 13 wherein means for monitoring for a GPS location trigger comprises:

means for determining a current GPS location; and means for determining if the current GPS location matches a service center GPS location stored in the telematics unit.

15. The system of claim 13, wherein means for sending at least a portion of the status data comprises:

means for storing the status data to a call center database; and means for extracting a predetermined data type from the call center database to send to the service center.

16. The system of claim 13, wherein the GPS location trigger is an activation signal received at the telematics unit.

17. The system of claim 13, further comprising:

means for determining whether the vehicle is within a service center proximity; and means for sending a service center location request based on the determination.

18. The system of claim 17, further comprising:

means for receiving a service center location request from a vehicle telematics unit at a call center; and means for sending a service center GPS location from the call center to the telematics unit based on the service center location request.

* * * * *